United States Patent Office 3,290,426
Patented Dec. 6, 1966

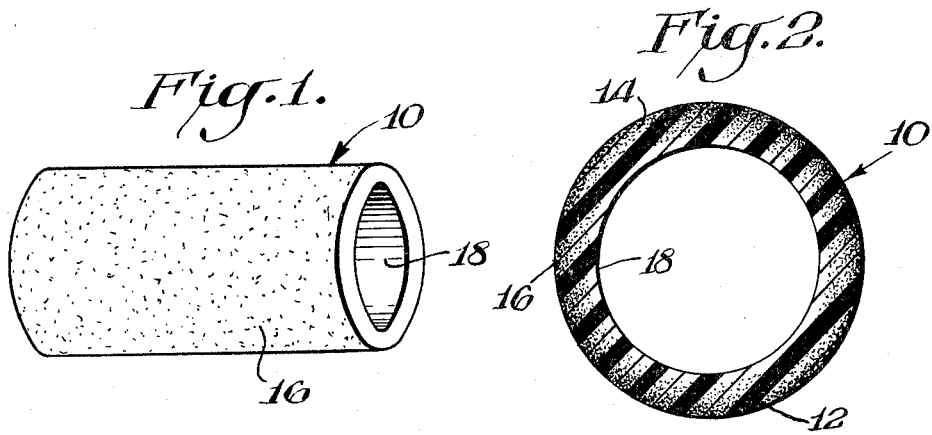
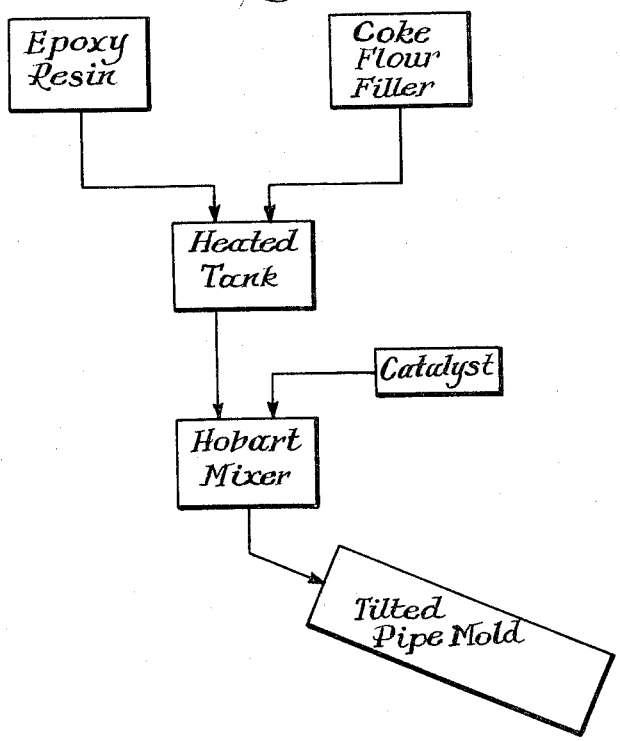

3,290,426
PLASTIC PIPE HAVING A CONDUCTIVE EXTERIOR SURFACE AND METHOD OF MAKING THE SAME
William J. Barrentine, Wilmington, Del., assignor to Transpolymer Industries Inc., Wilmington, Del., a company of Delaware
Filed Jan. 6, 1964, Ser. No. 336,057
7 Claims. (Cl. 174—47)

This invention relates to a composition pipe and more particularly to a resin composition or plastic pipe having a passage formed by an interior surface of the pipe which is mirror-like smooth and having an outer surface with substantially greater conductivity than the remainder of the pipe. This invention also relates to a centrifugal method of producing the pipe with a conductive outer surface.

A pipe having a smooth or uniform inner diameter is highly useful as conduit. It is desirable that the pipe be corrosion-resistant and a greater conductivity at the outer surface than at the inner portion of the pipe wall is also desirable. This surface conductivity is particularly desirable in a non-conductive pipe. Conductivity integrated into the composition making up the pipe wall provides a homogeneous structure while at the same time avoiding the shortcomings and inconveniences of a separate electrical shield around the pipe.

It will be understood that a smooth or mirror-like inner surface on the pipe is highly advantageous. For example, a uniform inner bore allows greater efficiency of the transport of liquids through the pipe. In the use of pipe for food processing a smooth surface is not susceptible to the retention of particles which can deteriorate in the transmission of semi-liquid substances of gummy and elastic materials. Moreover, in the use of the pipe for certain electrical operations such as the transmission of electrical energy, the interior of the conduit should have a very limited variation. One such demanding use is micro-wave transmission.

The production of composition pipes from synthetic resin materials as by polymerization creates certain problems. A thermosetting resin, for example, is formed into a desired shape while plastic and then is set into a hard and rigid condition with the addition of a catalyst and the application of heat. The conditions of forming the shape of the pipe from a plastic material to a rigid solid condition may be critical.

It is important to combine the advantages of the surface conductivity and a mirror smooth interior surface into a single structure by an effective, simple and readily reproducible production technique. Further, in the production of pipe it is important to be able to achieve these results with a variety of materials and thus provide a further adaptability of the manufacturing procedure and a variety in the resultant product.

It is an object of this invention to provide a pipe of non-conducting resinous material which is relatively conductive in a peripheral or outer zone in combination with a smooth, uniform inner diameter.

It is another object of this invention to form a non-conducting pipe from plastic material to provide a relatively conductive outer surface in an otherwise non-conducting pipe wall.

It is still another object of this invention to centrifugally form a pipe of a thermoset resinous composition in which the composition has a relatively greater conductivity in a thin zone at or adjacent to the outer surface and is relatively non-conducting at the smooth inner surface forming the pipe passage.

It is desirable to combine the above advantages with the other advantages of resin pipe such as strength and light weight. Further, it is desirable to provide a synthetic composition pipe which has an extremely uniform and accurately determinable inner diameter.

Other objects and advantages of the present invention will become apparent to one having ordinary skill in the art from a reading of the following description in conjunction with the accompanying drawing in which:

FIG. 1 is an elevational view of a pipe according to the present invention;

FIG. 2 is a cross-sectional view of the pipe shown in FIG. 1; and

FIG. 3 is a flow sheet diagram according to this invention.

In general, this invention provides a pipe 10 composed of a thermosetting resin 12 containing filler particles 14 and having a mirror-like smooth inner surface. The resin composition 12 is resistive and insulating while the filler particles 14 provides conductivity when present in a sufficient concentration. The invention also provides a method of producing the pipe from the thermosetting resins by simultaneous centrifugal casting and copolymerization in which the component materials of the pipe are mixed with a curing agent, heated, and subjected to a spinning motion.

In this invention the plastic pipe is produced from a thermosetting resin by a centrifugal molding procedure in which the factors of time, temperature and centrifugal pressure together with the relative proportion of a catalytic agent combine to produce a desired result. The flow sheet of FIG. 3 diagrammatically illustrates one suitable technique for the centrifugal molding of the pipe in which a conductive filler such as coke flour is mixed in a viscous epoxy resin which is warmed to provide wetting of the coke during mixing. The coke filler and the resin are suitably premixed in a tank by continuous agitation at an elevated temperature at which the epoxy maintains the desired viscosity. The catalystic or curing agent is prepared as by heating to a temperature to liquefy it for mixing with the resin composition at the time of molding.

The molding operation takes place by drawing a portion of the mixture of epoxy resin and coke from the premixed stage and adding the prepared curing agent to it and blending the curing agent with the epoxy-coke mixture for a critical period of time after which the condition of the charge is checked for its susceptibility to proper forming. At this point if the charge has reached the desired state the forming operation is instituted.

The charge is poured into a pipe mold which according to this invention is designed to spin when tilted so that it can be tilted and filled while spinning and the operation of getting the molding started takes the shortest possible time. This is desirable because it reduces the delay between the time that the charge reaches the desired and critical state and the institution of the molding operation proper. The mold has preferably been preheated to a desired temperature so as to maintain the mix at the mixing temperature during the filling and centrifuging operations. The mold is rotated at a speed which may be varied and in conjunction with the other variables of heat and time provides the control and the adaptability of the process. Generally speaking, however, the rotation of the mold is at a speed in excess of 1000 r.p.m. This rotation results in an instantaneous and uniform distribution of the material at the same time that the filler particles are concentrated in a zone at the periphery of the molded cylindrical object.

It is a feature of the preferred technique of this invention that the rotational speed is maintained after the mold is filled. In this way there is a concentration of the conductive filler particles at the outer periphery of the cylindrical product leaving the interior surface resin rich and mirror-like and relatively depleted of filler particles. The characteristics of this mirror-like interior surface is discussed in greater detail below. There remain some filler particles distributed throughout the resin material.

The thermoset resin containing the curing agent polymerizes during the rotation into a cylindrical pipe having a cylindrical outer surface 16 and a cylindrical interior surface 18. The cylindrical interior surface defines the hollow central passage of the pipe which provides the desired conduit. This rapid molding process involves rotation of the centrifugal mold for only a matter of minutes to bring about the desired solidification or setting of the product.

By the temperature-time-speed of rotation relationship the components of the charge are acted upon and the interior surface of the plastic pipe is produced with a mirror-like smoothness and a uniformity of dimension. This interior surface has the characteristic of a ruled surface traced by one side of a rectangle as it is rotated around the parallel side of the rectangle as an axis with the radius of the passage as the other dimension of the rectangle. This radius which forms the third dimension of the rectangle is uniform throughout the length of the formed section. Accordingly the cylindrical surface traced is correspondingly uniform.

The interior surface is smooth to a measurement in the range of about 20 to 40 microinches as measured by a surf indicator Mod. B11–10, common diamond trace. Previously it has not been possible to obtain smoothness to less than 60 microinches in a molded pipe.

The displacement of the resin and filler by the centrifugal action prevents stress and cracking and eliminates air bubbles in the product. At the same time the distribution of some filler throughout the molded material provides the desired integral composition. The catalyst controls the amount of shrinkage of the resin composition on setting. It is a feature that the catalyst should be heated to within ±10% of the resin temperature before addition to the resin filler mixture to form the charge.

The resultant pipe structure is an integral annular wall of the resin composition in its thermoset condition containing conductive filler particles distributed therein and having a concentration of the conductive filler particles at the periphery to provide a conductive zone and at the same time to provide a resin rich interior surface which is uniform in dimension to exhibit a mirror-like finish. The interior surface have many times the resistivity of the outer conductive zone and so is insulating by comparison.

The conductive particles are discrete. Coke flour, carbon black, petroleum coke or graphite are suitable. The preferred filler is calcined coke flour having an oxidation threshhold defined at 1% loss in 24 hours at 525 to 550° F. One satisfactory formulation of these particles has up to 5% by weight of particles of one micron or less, 50 to 85 by weight of particles of up to 200 mesh and 10 to 45% by weight of other particles.

Another set formulation of coke flour particles has around 10% by weight of particles of one micron or less and 90% by weight of particles up to 100 mesh. It is preferred that the chemical analysis of the coke shows a carbon content of a minimum of 98% with the balance including such metal oxides as $SiO_2$, $Fe_2O_3$, $Al_2O_3$, CaO, MgO, sulfur and miscellaneous metal oxides.

*Example*

250 pounds of epoxy resin and 250 pounds of coke flour filler were premixed in a 50 gallon tank which was continuously agitated at 18 r.p.m. and maintained at 240° F. m-phenyldiamide was heated to 150° F. to liquify it in a heated tank. The epoxy-coke mixture was drawn from the storage tank and blended with the catalyst in a proportion of 7 parts to 100 parts. The blending took place in a Hobart mixer for exactly 5 minutes at the end of which the charge temperature was checked. When the temperature of the catalyzed charge was about 235° F. and showed an increase in viscosity the charge was poured into a spinning tilted pipe mold which had been preheated to 200 to 220° F. The pipe mold was spun at a speed of 1100 r.p.m. to insure instantaneous and uniform distribution. The product thermoset in a time period of less than 10 minutes from the addition of the catalytic agent to the hot resin-filler composition through the completion of the spinning operation. The thermoset plastic pipe section was then removed from the centrifugal mold.

This method makes pipe of from ⅛" in wall thickness upward. The main portion of the conductive particles are concentrated in the very thin peripheral zone at the outer surface and thus form a conductive or sheath integral with the resin body of the pipe but of a different conductivity.

For example, a 2" O.D. pipe having a cylindrical wall ¼" thick and an interior passage of 1½" diameter was made up of epoxy resin and coke flour filler according to the above-described centrifugal molding method. The coke flour filler lies mainly in the peripheral zone of the pipe which has conductivity greater than the other portions of the pipe and provides the pipe with an insulation resistance of the order of 100,000 ohms for sections of the pipe of 6" x 1" x ¼" and 6" x ¼" x ¼. This relative conductivity is provided solely by the peripheral zone with its coke flour preponderance. By comparison the inner portions of the pipe wall have a resistance several times the 100,000 ohms of the 6" sections mentioned above. Thus a 2" O.D. pipe with a ¼" wall has a thin peripheral zone which provides an insulation resistance for specimens 6" long and from ¼" to 1" wide of about 100,000 ohms. It will be understood that the above-specified 2" O.D. of the pipe refers to a nominal 2" O.D.

Thus this invention provides conductivity in a peripheral zone which is integral with the resin body.

Various modifications of the above-described invention may be made within the spirit thereof. For example, other thermoset resins may be substituted for the epoxy thermosets; for example, furane, phenolic and polyester thermoset resins are adaptable to this invention.

Among other advantages this invention provides a method for producing plastic pipe within close tolerances. The integral conductive sheath on the plastic pipe serves as a shield and has other electrical attributes.

What is claimed is:

1. A plastic pipe comprising a cylinder wall composed of a thermosetting resin and containing an inert conductive particulate filler, a passage through said pipe formed by a resin rich smooth interior surface of said wall completely free from filler particles and having a high electrical resistivity and a zone at the periphery of the wall having a concentration of filler particles and having an electrical resistivity substantially less than said interior surface.

2. A plastic pipe comprising a cylinder wall composed of a thermosetting resin and containing and inert conductive particulate filler, a passage through said pipe formed by a resin rich smooth interior surface of said wall depleted of filler particles and having an electrical resistance of several times 100,000 ohms and a zone at the periphery of the wall having a concentration of filler particles and having an electrical resistance of less than 100,000 ohms for a section of pipe 6 inches in length.

3. A plastic pipe comprising a cylinder wall composed of a thermosetting resin and containing an inert conductive filler, a passage through said pipe formed by said wall, a resin rich smooth interior surface of said passage with irregularities of less than 40 microinches and having an insulating resistivity and a zone at the periphery of the wall having a concentration of the inert conductive filler and a conductivity greater than said interior surface.

4. A plastic pipe comprising a cylinder wall composed of a thermosetting resin and containing an inert conductive filler of small particles, a passage through said pipe formed by a resin rich smooth interior surface of said wall and having irregularities only in the range of 20-40 microinches and having an insulating resistivity and a thin zone at the periphery of the wall having a concentration of filler particles providing a conductivity many times greater than said interior surface.

5. A plastic pipe comprising a cylinder wall composed of an epoxy resin and containing a coke filler made up of from 1% to 5% of 1 micron or less in size, 50% to 85% of up to 200 mesh in size, and 10% to 45% other sizes, a passage through said pipe formed by a resin rich smooth interior surface of said wall depleted of filler and having surface irregularities of less than 40 microinches and having an electrical resistance of several times 100,000 ohms for a section of six inches in length and an integral zone at the periphery of the wall having a concentration of filler and having an electrical resistance of around 100,000 ohms for a section of six inches in length.

6. A plastic pipe comprising a cylinder wall composed of a thermosetting resin and containing a coke filler made up of from 1% to 5% of 1 micron or less in size, 50% to 85% of up to 200 mesh in size, and 10% to 45% other sizes, a passage through said pipe formed by a resin rich smooth interior surface of said wall completely free from filler having surface irregularities of less than 40 microinches and having an electrical resistance of several times 100,000 ohms for a section of six inches in length and an integral zone at the periphery of the wall having a concentration of filler and having an electrical resistance of around 100,000 ohms for a section six inches in length.

7. A process of producing resin pipe comprising the steps of premixing thermosetting resin and a particulate conductive filler to form a resin-filler mixture, providing a curing agent, blending predetermined amounts of the resin-filler mixture and curing agent to form a molding composition, providing a tilted pipe mold, spinning the pipe mold about its longitudinal axis, and introducing the molding compositon into the spinning pipe mold to thereby form a resin pipe having an interior surface completely free from conductive filler and an exterior surface having an concentration of conductive filler.

References Cited by the Examiner

UNITED STATES PATENTS

| | | | |
|---|---|---|---|
| 2,874,412 | 2/1959 | Fleming et al. | 264—311 |
| 2,887,728 | 2/1959 | Usab | 264—311 X |
| 2,994,919 | 8/1961 | Schater et al. | 264—311 X |
| 3,150,219 | 9/1964 | Schmidt | 264—311 X |

FOREIGN PATENTS 680,249  2/1964  Canada.

LEWIS H. MYERS, *Primary Examiner.*

DARRELL L. CLAY, *Examiner.*